United States Patent Office 3,367,253
Patented Feb. 6, 1968

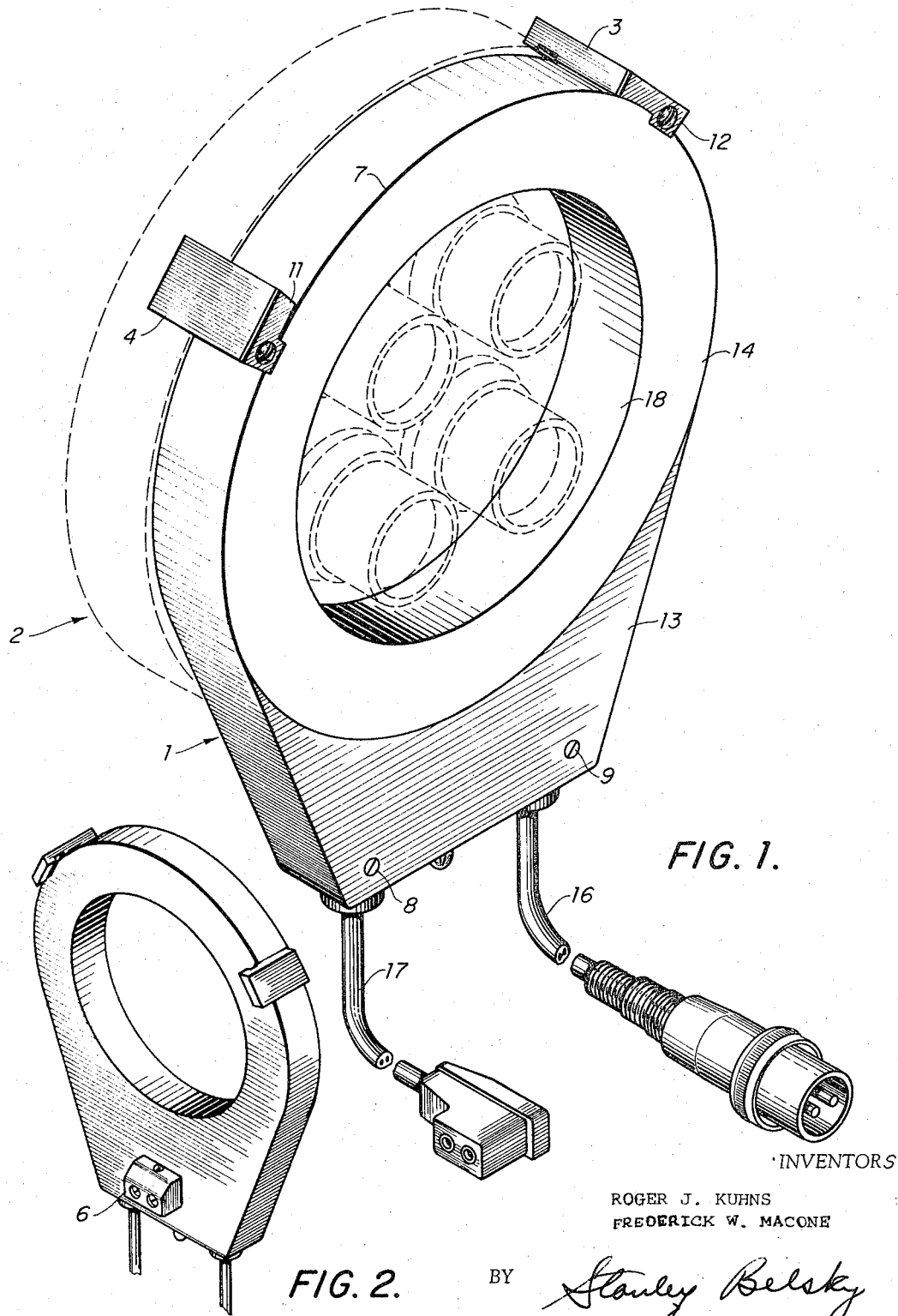

3,367,253
MULTIPLE IMAGE FLASH CAMERA
Roger J. Kuhns, Lincoln, and Frederick W. Macone, Carlisle, Mass., assignors to Avant Incorporated, Lincoln, Mass., a corporation of Massachusetts
Filed Oct. 23, 1965, Ser. No. 503,553
9 Claims. (Cl. 95—18)

The present invention relates to multiple image flash cameras.

One type of multiple image flash camera utilizes a cluster of lenses coacting with a shutter, a flashlamp and a photographic plate divided into a number of image areas corresponding to the number of lenses and hence the number of simultaneously exposed prints. Diffusion transfer process film is employed to produce a number of positive prints from the single actuation of the shutter in a matter of seconds. Such a camera is disclosed in U.S. Patent 3,128,685 of Samuel Kitrosser. A problem encountered in the use of these cameras relates to unevenness in the resulting prints, i.e. some are lighter or darker than others. This is because the flashlamp is positioned to one side or above or below the aforesaid lens cluster, and as a result, the illumination intensity of the subject or object plane is not uniform, because the distances between various points in the object plane and the offset flashlamp vary enough to cause unevenness in the illumination intensity in accordance with the inverse square law. These cameras are often used by the government and industry to take for example four simultaneous pictures used for identification purposes. Unevenness in illumination often causes a Caucasian to look like a Negro and vice versa. Also, the appearance of the subject often varies which is obviously very undesirable.

Additionally, although most light gathered by the lenses is light reflected off of the subject being photographed, a certain amount of light is received directly from the flashlamp area. Those lenses closer to the flashlamp area receive more intense light than those further away so as to compound the problem of unevenness between the resulting prints.

Accordingly, it is a principal object of the present invention to provide a new and improved multiple lens flash camera.

It is a further object of the present invention to provide a new and improved multiple lens flash camera which produces even illumination of an object plane being photographed.

It is a further object of the present invention to provide a new and improve multiple lens flash camera which assures the production of uniformly exposed prints by a multiple image camera.

It is yet a further object of the present invention to provide a new and improved multiple lens flash camera which eliminates light transmitted directly directly from the flashlamp area to the lenses.

For a better understanding of the present invention, reference is made to the following description taken in conjunction with the following drawings, and the scope will be pointed out in the appended claims.

In the drawings:

FIG. 1 discloses a front perspective view of a preferred embodiment of the invention.

FIG. 2 discloses a back perspective view of a preferred embodiment of the present invention.

In accordance with the present invention, an elongated flashlamp is shaped and positioned to substantially surround a multiple lens system, and as a result the aforesaid problems of illumination unevenness between simultaneously exposed prints are eliminated. An elongated flashtube is mounted within an opaque trough which is positioned forward of the multiple lens system to sharply reduce or eliminate light which would otherwise be transmitted directly from the flashlamp to the lens system.

In FIG. 1, flashlamp housing 1 is mounted to multiple lens camera 2 by means of fasteners 3 and 4 and detent latch 6 shown in FIG. 2. However, the particular means used to affix the flashlamp housing to the camera form no part of the present invention and accordingly details thereof have been omitted. Flashlamp housing 1 includes a plastic front cover 7 which is mounted to housing 1 by means of machine screws 8 and 9 and clamps 11 and 12. Portion 13 of housing 1 is opaque while portion 14 is translucent to provide for light diffusion which further aids in the attainment of illumination uniformity. Preferably, the flashtube contained within housing 1 is elongated and circular in shape and substantially surrounds the central optical axis, so that, when the flashtube is triggered by a conventional flashtube trigger circuit within housing 1, the entire annular translucent portion 14 is bright illuminated. As the operation of flashtubes and the circuitry for energizing them are well-known to those skilled in the art, they are not disclosed herein. A 900 volts DC power cable 16 and a flashtube trigger switch cable 17 are connected to the housing as shown. All that need be said is that the actuation of the camera shutter mechanism connected to trigger cable 17 causes a high voltage spike to be applied to the control electrode of the flashtube to cause it to flash.

However, it is important to observe that since the annular, translucent, light-emissive portion 14 of housing 1 surrounds the entire multiple lens system, it is thus symmetrically positioned thereabout. The annular surface may be considered to be made up of a large plurality or an infinite number of light-emitting point sources, each of which has a diametrically opposite corresponding point equidistant from the central axis. In other words, the lamp housing may be described as means for positioning a large plurality of point sources about the relatively large multiple lens system. The integration of the effects of each point at the subject plane results in illumination uniformity not heretofore obtainable. The reduction in intensity of light emanating from a right-hand point source at the left of the object plane is complemented by the more intense light at the left produced by a corresponding left-hand point source, and vice versa. The light diffusion capability of the translucent portion 14 of housing 1 further increases the uniformity of illumination.

While the circular configuration is strongly preferred, other lamp configurations are contemplated. For example, the translucent portion 14 may be shaped in the form of an oval, rectangle, triangle or portions thereof, which at least partially surround the lens system. Other irregular shapes may be employed. For example, in a twin-lens or cylindrical lens system, an oval shape might be preferred since space may be thereby conserved and the lamp length could be kept at a minimum.

It is also important to note that opaque sidewall portion 18 of housing 1 extends beyond the multiple lens system so that the aforesaid direct illumination of the lenses by light emanating from the flashlamp area is reduced to an absolute minimum.

While we have described what is presently considered the preferred embodiment of our invention, it will be obvious to those skilled in the art that various other changes and modifications may be made therein without departing from the inventive concept, and it is aimed in the appended claims to cover all such changes and modifications as fall within the true spirit and scope of our invention.

We claim:
1. In a camera having a multiple lens system occupying a portion thereof and for producting a plurality of simultaneously exposed prints, the improvement comprising:

a source of illumination having an elongated light-emitting surface at least partially surrounding said multiple lens system.

2. The combination as set forth in claim 1, wherein said light-emitting surface has an arcuate shape.

3. The combination as set forth in claim 1, wherein said light-emitting surface substantially surrounds said lens system.

4. The combination as set forth in claim 3, wherein said light-emitting surface has an arcuate shape.

5. The combination as set forth in claim 4, wherein said light-emitting surface has a substantially circular shape.

6. In a camera having a multiple lens system for viewing an object plane and for producing a plurality of simultaneously exposed prints, the improvement comprising:
   an elongated light-emitting surface substantially surrounding said multiple lens system, and
   means for positioning said light-emitting surface forward of said multiple lens system and closer to said viewed object plane than said multiple lens system, thereby to eliminate the transmission of light directly from said light-emitting surface to said multiple lens system.

7. The combination as set forth in claim 6, wherein said elongated, light-emitting surface has a substantially circular shape.

8. The combination as set forth in claim 6, wherein said means for positioning comprises a trough having an opaque sidewall facing said multiple lens system.

9. In a camera having a multiple lens system for viewing an object plane and for producing a plurality of simultaneously exposed prints, the improvement comprising:
   an elongated, substantially circular, light-emitting surface substantially surrounding said multiple lens system, and
   means for positioning said light-emitting surface forward of said multiple lens system and closer to said viewed object plane than said multiple lens system, said means for positioning further comprising a trough having an opaque sidewall facing said multiple lens system to eliminate the transmission of light directly from said light-emitting surface to said multiple lens system.

References Cited

UNITED STATES PATENTS 2,185,508   1/1940   Kunze _____ 95—38 X

JOHN M. HORAN, *Primary Examiner.*